| (12) United States Patent<br>Irrgang et al. | (10) Patent No.: US 10,540,810 B2<br>(45) Date of Patent: Jan. 21, 2020 |

(54) SYSTEM AND METHOD OF RENDERING A GRAPHICAL OBJECT WITH MODIFICATION IN STRUCTURE

(71) Applicant: CANON KABUSHIKI KAISHA, Tokyo (JP)

(72) Inventors: Steven Richard Irrgang, North Ryde (AU); Thai Quan Huynh-Thu, Edgecliff (AU); Juno Kim, Bexley (AU); Vanessa Jeanie Honson, Karela (AU); Matthew Raphael Arnison, Umina Beach (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 26 days.

(21) Appl. No.: 16/008,859

(22) Filed: Jun. 14, 2018

(65) Prior Publication Data

US 2019/0005710 A1 Jan. 3, 2019

(30) Foreign Application Priority Data

Jun. 30, 2017 (AU) .................................. 2017204504

(51) Int. Cl.
*G06T 15/50* (2011.01)
*G06T 15/04* (2011.01)

(52) U.S. Cl.
CPC .............. *G06T 15/50* (2013.01); *G06T 15/04* (2013.01)

(58) Field of Classification Search
CPC ............................................... G06T 15/50–87
See application file for complete search history.

(56) References Cited

U.S. PATENT DOCUMENTS

2013/0016100 A1* 1/2013 Bickel ................... G06T 17/00
345/420
2016/0292836 A1 10/2016 Perry et al.
(Continued)

OTHER PUBLICATIONS

Khan, Erum Arif, et al. Image-based material editing. vol. 25. No. 3. ACM, 2006. (Year: 2006).*

(Continued)

*Primary Examiner* — Daniel F Hajnik
(74) *Attorney, Agent, or Firm* — Canon U.S.A., Inc. IP Division

(57) ABSTRACT

A method of rendering a graphical object comprises accessing a mapping relating a mesoscale structure and a light scattering parameter of a material to a perceptual appearance characteristic; determining a perceptual appearance characteristic of the graphical object, the graphical object reproduced on an interface to represent an object formed from the material, the perceptual appearance characteristic determined in accordance with the mapping using an initial mesoscale structure and a light scattering parameter of the material; receiving a signal indicating a modification in structure relating to the initial mesoscale structure; and determining, using the mapping, an adjustment of the light scattering parameter preserving the determined perceptual appearance characteristic, based on the modification of the initial mesoscale structure. The method further comprises adjusting the light scattering parameter of the material according to the adjustment; and rendering the graphical object using the modified mesoscale structure and the adjusted light scattering parameter.

19 Claims, 10 Drawing Sheets

(56) References Cited

U.S. PATENT DOCUMENTS

2016/0318259 A1* 11/2016 Seto .................... H04N 1/6019
2018/0018810 A1* 1/2018 Morovic ............... G06T 15/503
2018/0120814 A1* 5/2018 Valade .................. B33Y 30/00

OTHER PUBLICATIONS

Bala, Kavita. "Predictive rendering for accurate material perception: modeling and rendering fabrics." Human Vision and Electronic Imaging XVII. vol. 8291. International Society for Optics and Photonics, 2012. (Year: 2012).*
Lin Qi; Mike J. Chantler; J. Paul Siebert; Junyu Dong; "The joint effect of mesoscale and microscale roughness on perceived gloss;" Vision Research 2015, 115, Part B, pp. 209-217.
Obein et al.; "Difference scaling of gloss: non-linearity, binocularity and constancy;" Journal of Vision (2004), 4, pp. 711-720.
Wei Ji et al.; "Gloss as an aspect of the measurement of appearance;" Journal of Optical Society of America, A/vol. 23, No. 1/Jan. 2006; pp. 22-33.
Hunter; "Methods of determining gloss"; Research Paper RP958; Journal of Research of the National Bureau of Standards, vol. 18, Jan. 1937; pp. 19-39.
Ho et al.; "Conjoint measurement of gloss and surface texture;" Psychol. Sci., Feb. 2008; pp. 1-16.

* cited by examiner

SYSTEM AND METHOD OF RENDERING A GRAPHICAL OBJECT WITH MODIFICATION IN STRUCTURE

REFERENCE TO RELATED PATENT APPLICATION(S)

The application claims the benefit under 35 U.S.C. § 119 of the filing date of Australian Patent Application No. 2017204504, filed 30 Jun. 2017, hereby incorporated by reference in its entirety as if fully set forth herein.

TECHNICAL FIELD

The present invention relates to a method of and an apparatus of image processing for simulating, visualizing, and editing the surface appearance of a material on a computer monitor.

BACKGROUND

Accurate colour editing and reproduction is a mature technology in the field of two dimensional (2D) printing, especially for diffuse colour reproduction and printing. However, reproduction of only colour does not allow representing a very wide range of material appearances, including reflective properties such as for shiny metallic surfaces. The sole use of colour to represent a reflective characteristic such as a shiny metallic surface leads to a dull plastic appearance when under varying illumination and viewing conditions. Recent 2D printing systems have added further capabilities to control optical properties of the printed surface, including but not limited to angular-dependent reflection properties of the print and translucency.

Furthermore, in recent years, 2.5 dimensional (2.5D) and three dimensional (3D) printing technologies have emerged. 2.5D printers allow printing a limited height relief, similar to the height relief of oil paintings, and 3D printers allow printing objects with arbitrary shapes. 3D printing has been mainly used as a fast prototyping tool for functional purposes where accuracy of the shape is most important but colour or texture bears minor to no importance. In contrast, 2.5D printing focuses on printing applications where the aesthetic aspect of the surface is of high importance. In 2.5D printing, the appearance of the surface of the object plays a crucial role in the perception and value of the object. Characteristics affecting surface appearance, such as diffuse colour, highlight/reflection colour, glossiness, roughness and colour travel, impact the user's perception of the appearance of that object or surface. Current applications of such technology include artwork reproduction, design, and high-quality packaging, where appearance can vary locally, e.g. from matte/dull to shiny/glossy.

For example, artwork reproduction of oil paintings is used for educational purposes and requires a precise replication of surface texture and gloss to recreate the artist's original painting. Cultural heritage can be digitally preserved by 3D scanning the art object and requires the scanning of not only the colour information of the surface of the object but also of the precise relief of the surface and light reflectance characteristics of the surface. An oil painting typically exhibits a certain gloss that contributes to the artistic intent and therefore needs to be captured in the digital scan, and reproduced physically if the scanned object is printed. The scanning of the object is not the field of this invention. Once the object is digitally imported into a computer, it then needs to be digitally processed before printing. Colours and other appearance aspects of the surface may need adjustment. In another example of object design, the user designs an object and its appearance using a computer-aided design (CAD) software tool and wants to manipulate the surface appearance of the object to a desired effect, such as giving a glossy metallic effect to the surface.

Colour editing and management is a known practice in the printing industry workflow. However, controlling additional aspects related to the optical characteristics of the surface is still a technical challenge. In general, designers rely on CAD software tools to produce or reproduce a desired surface appearance, sometimes termed 'look and feel'.

In a typical scenario, a user wants to design an object and the object's surface appearance, for example a piece of jewellery with a metallic golden reflection aspect. A computer-aided design software tool is often used to design the shape of the object in the form of a 3D mesh of polygons. The same software or different software is used to apply a texture on the 3D mesh and to manipulate the surface appearance. The texture, with specific geometric variations, can be chosen from a library of examples to be applied on the surface of the object. Parameters related to geometry of the surface, such as bumpiness, randomness, and frequency, are set by the user. Additionally, parameters related to the behaviour of the surface in relation to light reflections can be set by the user. Parameters related to perceived surface appearance, such as diffuse colour, reflectivity, roughness, gloss are manually set by the user until satisfied by the appearance as simulated on the computer monitor. Each parameter is controlled independently from all other parameters. In particular, surface geometry is controlled independently to the reflectance characteristics of the surface. In conventional tools, knowing which parameter(s) to modify and how to modify the parameter(s) requires a high level of expertise and experience with such tools. The parameters are either directly mapped to mathematical parameters in the rendering model and are therefore not intuitive to understand in terms of their effect on surface appearance, or are high-level concepts that require the user's understanding and often do not map directly to the rendering model that drives the modification of the reflectance properties of the material. Furthermore, the parameters do not relate to the mesoscale geometry of the surface, which can affect the perceived appearance, for example perceived gloss. Perceived gloss or glossiness is the perceptual response of the human visual system processing the light information related to physical gloss coming from the object's surface. Perceived gloss is related to the capability of the human visual system to distinguish between diffuse and specular light information coming from the surface, and the interpretation by the human visual system of the information related to these two components. This interpretation depends for example on the sharpness of specular reflections.

In a scenario where the object is intended to be printed, it is desirable for the rendering system to provide a preview of the result of the print. In such case, the simulated material is digitally displayed so that the user can have a precise idea of the finished state of the edited material. The user previews the edited material in order to judge and confirm the target appearance, including perceived colour and reflectance properties of the surface. The function is important to reduce the number of printing trials and errors otherwise needed by the user to obtain the desired printed appearance. In the absence of a preview function, the user needs to print the current edited material, and confirm if the result is as the user desired. If this is not the case, the user needs to modify some material appearance settings, print again and visually confirm again if the printing result matches the user's expectation. The development process can therefore be time-consuming and expensive to achieve a desired material appearance. A preview function can reduce substantially the time and cost of achieving a desired printed material appearance.

As 3D and 2.5D printing become more widely available, the need to create and modify the appearance of materials is spreading to a wider range of users, often not specialised or familiar with graphics parameters.

SUMMARY

It is an object of the present invention to substantially overcome, or at least ameliorate, one or more disadvantages of existing arrangements.

One aspect of the present disclosure provides a method of rendering a graphical object in response to a modification in structure, the method comprising: accessing a mapping relating a mesoscale structure and at least one light scattering parameter of a material to a perceptual appearance characteristic; determining a perceptual appearance characteristic of the graphical object, the graphical object reproduced on an interface to represent an object formed from the material, the perceptual appearance characteristic determined in accordance with the mapping using an initial mesoscale structure and at least one light scattering parameter of the material; receiving, via the interface, a signal indicating the modification in structure, the modification in structure relating to modification of the initial mesoscale structure; determining, using the mapping, an adjustment of the at least one light scattering parameter preserving the determined perceptual appearance characteristic, based on the modification of the initial mesoscale structure; adjusting the at least one light scattering parameter of the material according to the determined adjustment; and rendering the graphical object using the modified mesoscale structure and the adjusted at least one light scattering parameter.

According to one aspect, the preserved perceptual appearance characteristic is one of gloss and colour.

According to one aspect, the at least one light scattering parameter of the mapping is at least one of reflectivity and roughness of a bidirectional reflectance distribution function (BRDF) function of the material.

According to one aspect, the signal to modify the mesoscale structure relates to modification of a height scale value of the graphical object.

According to one aspect, if the modification in structure relates to a height scale value of the material, the adjusted at least one light scattering parameter relates to a roughness of a bidirectional reflectance distribution function (BRDF) and the preserved perceptual appearance characteristic is glossiness of the material.

According to one aspect, the rendering comprises determining regions of the graphical object in shadow relative to a direct light source.

According to one aspect, the rendering comprises determining a mesh relating to the object and determining a closest visible face of the mesh closest to a pixel of a display screen.

According to one aspect, the at least one light reflecting parameter is determined based on a microfacet model of the graphical object.

According to one aspect, the graphical object represents substantially flat object with variations in height.

According to one aspect, forming a modified mesoscale structure comprises updating a mesh representation of the graphical object.

According to one aspect, the signal to modify the mesoscale structure relates to modification of one of a frequency or randomness of a roughness of a surface of the material.

According to one aspect, if the modification in structure relates to a height scale value of the material, the adjusted at least one light scattering parameter relates to a roughness of a bidirectional reflectance distribution function (BRDF) and the preserved perceptual appearance characteristic is the glossiness of the material.

According to one aspect, if the modification in structure relates to a height scale value of the material, the adjusted at least one light scattering parameter relates to the diffuse colour in the bidirectional reflectance distribution function (BRDF) and the preserved perceptual appearance characteristic is the perceived colour of the material.

According to one aspect, the at least one light scattering parameter of the mapping relates to a colour used for rendering the material.

Another aspect of the present disclosure provides apparatus configured to render a graphical object, comprising: a display; a memory; a processor configured to execute code stored on the memory to: reproduce, on the display, a graphical user interface (GUI); access a mapping relating a mesoscale structure and at least one light scattering parameter of a material to a perceptual appearance characteristic; determine a perceptual appearance characteristic of the graphical object, the graphical object representing an object formed from the material, the perceptual appearance characteristic determined in accordance with the mapping using an initial mesoscale structure and at least one light scattering parameter of the material; reproduce the graphical object on the GUI based on the determined perceptual appearance characteristic; receive, via the GUI, a user interaction indicating a modification in structure of the initial mesoscale structure; determine, using the mapping, an adjustment of the at least one light scattering parameter preserving the perceptual appearance characteristic, based on the modification of the initial mesoscale structure; adjust the at least one light scattering parameter of the material according to the determined adjustment; and render, in the GUI, the graphical object using the modified mesoscale structure and the adjusted at least one light scattering parameter.

According to one aspect, the user interaction relates to interaction with one or more sliders, each representing mesoscale structure of the material presented by the GUI.

According to one aspect, the one or more sliders relate to at least one of a height ratio and frequency of bumps of a surface of the graphical object.

Another aspect of the present disclosure provides a non-transitory computer-readable medium having a computer program stored thereon in response to a modification in structure, the method comprising: access a mapping relating a mesoscale structure and at least one light scattering parameter of a material to a perceived gloss of a material; determine a perceived gloss of the graphical object, the graphical object reproduced on an interface to represent an object formed from the material, the perceived gloss determined in accordance with the mapping using an initial mesoscale structure and at least one light scattering parameter of the material; receive, via user interaction with the GUI, a signal indicating a modification in a height scale value of the material; determine, using the mapping, an adjustment of roughness of the material preserving the perceived gloss, based on the modification; adjust the at roughness of the material of the graphical object according to the determined adjustment; and render the graphical object using the modified height scale value and the adjusted roughness.

Another aspect of the present disclosure provides a system, comprising: a memory; and a processor, wherein the processor is configured to execute code stored on the memory for implementing a method rendering a graphical object in response to a modification in structure, the method comprising: accessing a mapping relating a mesoscale structure and at least one light scattering parameter of a material to a perceptual appearance characteristic; determining a perceptual appearance characteristic of the graphical object, the graphical object reproduced on an interface to represent an object formed from the material, the perceptual appearance characteristic determined in accordance with the mapping using an initial mesoscale structure and at least one light scattering parameter of the material; receiving, via the interface, a signal indicating the modification in structure, the modification in structure relating to modification of the initial mesoscale structure; determining, using the mapping, an adjustment of the at least one light scattering parameter preserving the determined perceptual appearance characteristic, based on the modification of the initial mesoscale structure; adjusting the at least one light scattering parameter of the material according to the determined adjustment; and rendering the graphical object using the modified mesoscale structure and the adjusted at least one light scattering parameter.

Other aspects are also described

BRIEF DESCRIPTION OF THE DRAWINGS

One or more embodiments of the invention will now be described with reference to the following drawings, in which.

DETAILED DESCRIPTION INCLUDING BEST MODE

Figure 1:
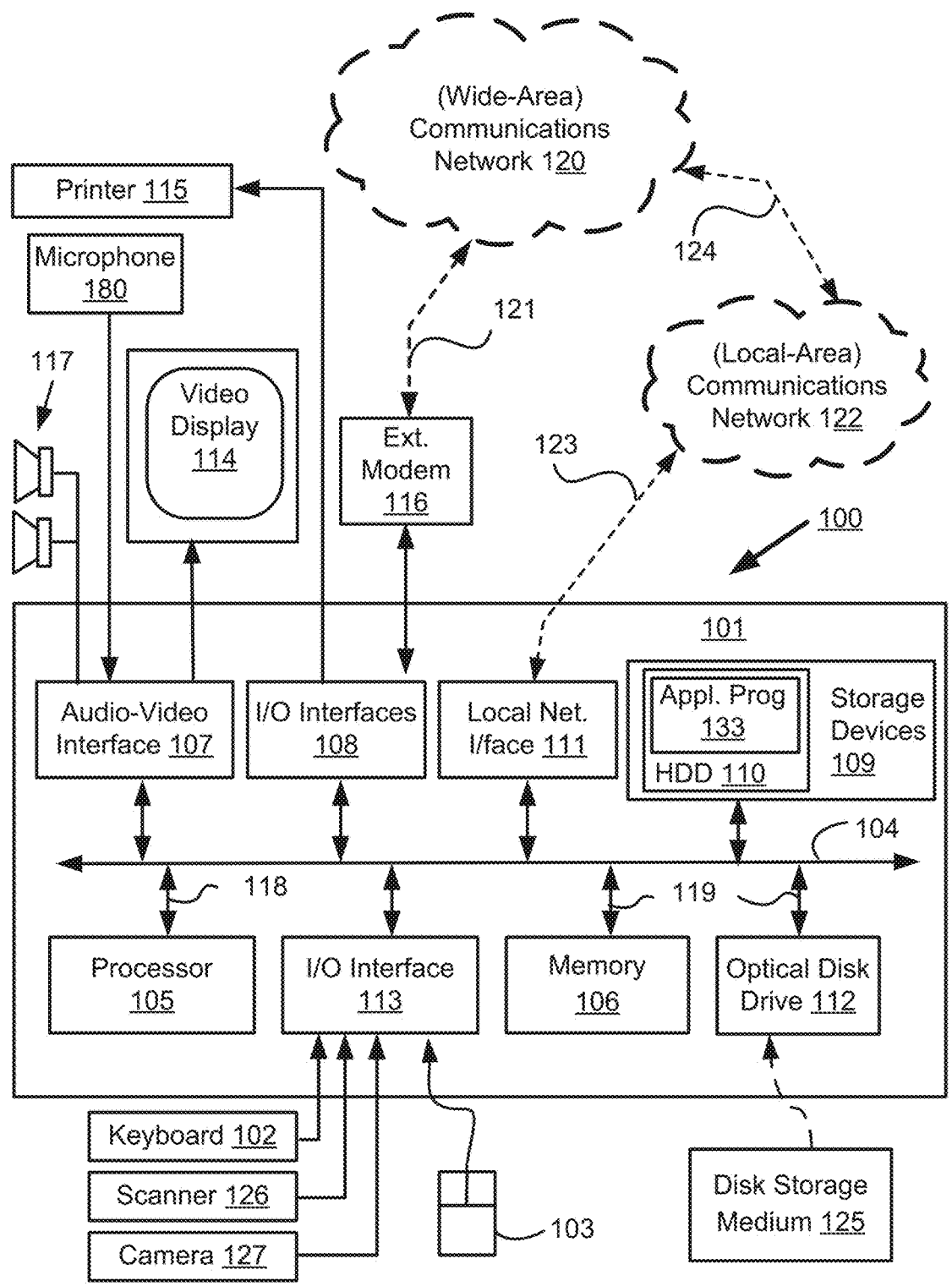
FIGS. 1 and 2 form a schematic block diagram of a general purpose computer on which the arrangements described may be practised.

Where reference is made in any one or more of the accompanying drawings to steps and/or features, which have the same reference numerals, those steps and/or features have for the purposes of this description the same function(s) or operation(s), unless the contrary intention appears.

The arrangements described relate to the editing and manipulation of the appearance of a material surface on a computer monitor by using image processing techniques, while a digital representation of the surface of a material is simulated and visualized or rendered using the software. The surface appearance varies according to different characteristics, such as reflectivity and roughness, illumination conditions and viewing angles.

The arrangements described provide a user with a method and an intuitive interface for manipulating the appearance of a surface, where several parameters controlling the surface appearance interact to produce the appearance. The arrangements described relate to a method to automatically set the other parameters upon modification of one of the parameters, in order to substantially maintain the same surface appearance following modification of the first parameter.

The arrangements described relate to preservation of appearance characteristics of a surface as perceived by a user, also referred to as perceptual appearance characteristics. A perceptual appearance characteristic typically corresponds to a property of the object which a user may wish to modify. In the context of the present application, the perceptual appearance characteristic is typically influenced by multiple rendering parameters. Examples of perceptual appearance characteristics include perceived gloss (or glossiness), perceived colour, sheen, shine, sparkle and grunge.

Gloss, as described further below, represents whether a surface of an object appears polished to the user and has sharp specular reflections. Colour relates to how saturated or bright colours are perceived to be and in some instances relates to a variety of colours of the surface. The characteristics of specular reflections influence perceived gloss and perceived colour. For example, sharpness of specular reflections influence perception of colour lightness, as well as the perceived distinction between diffuse and specular information. Congruence between diffuse and specular information also influence perceived gloss. Sheen relates to a perceived white haze forming a silhouette around an object, particularly around edges. Shine is similar to gloss but relates more to reflected light than gloss. Sparkle relates to an effect where relatively small areas have relatively strong reflections at specific angle, the small area being arranged such that as a viewer moves around the object, the strong reflections move seemingly randomly. Grunge relates to a characteristic often added by to rendered designs relating to addition of appearance of dirt or grime for an appearance more typical of a real world object.

In the arrangements described the surface relates to a surface of a graphical object representing an object formed of a particular material. The graphical object is generated, stored and manipulated by a user interacting with an interface executing on a computer system.

Figure 2:
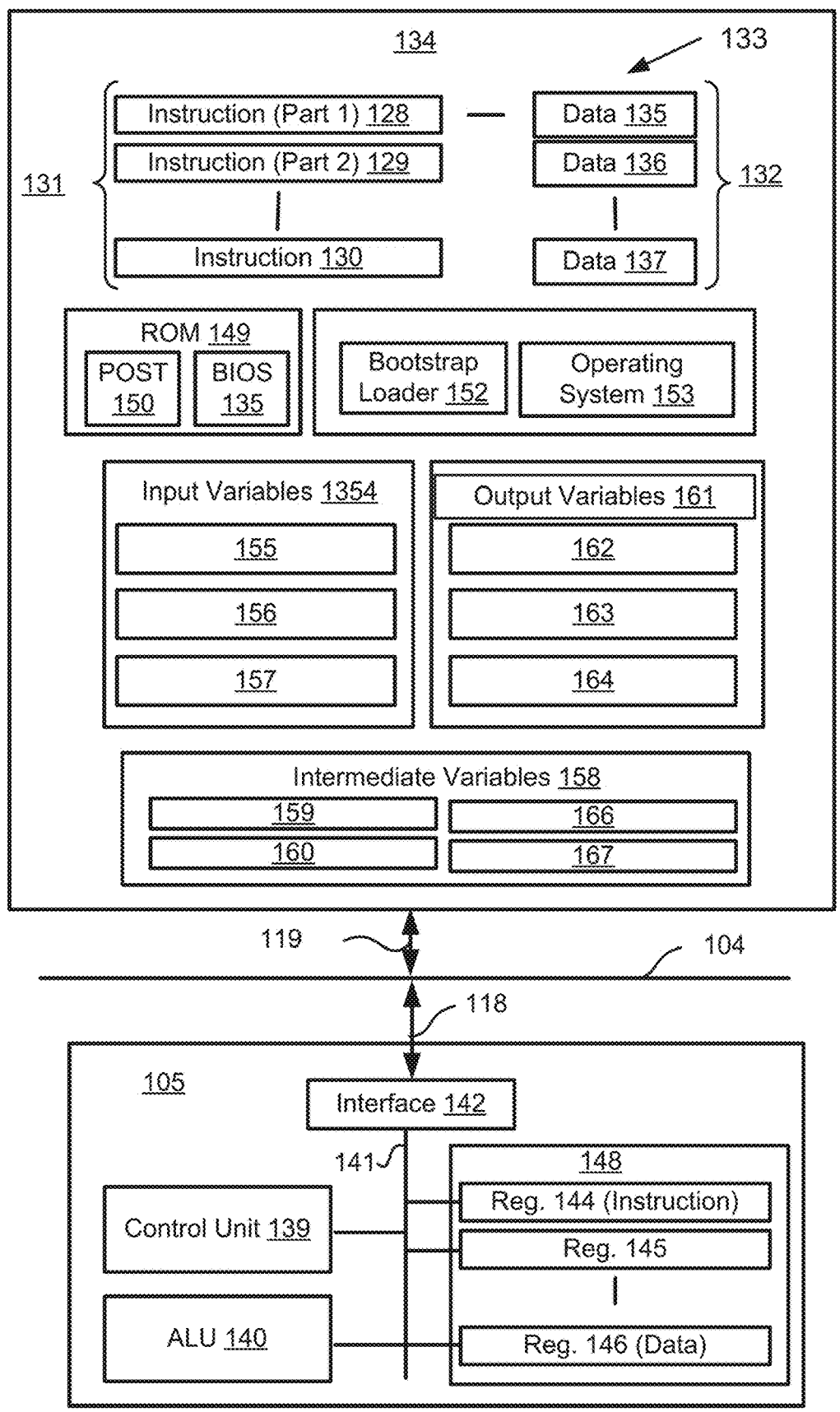

FIGS. 1 and 2 depict a general-purpose computer system 100, upon which the various arrangements described can be practiced.

As seen in FIG. 1, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN.

Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 is typically a desktop computer, a laptop computer or a server computer. In some arrangements, the module 101 is a portable device, such as a tablet device.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ Or like computer systems.

Figure 5:
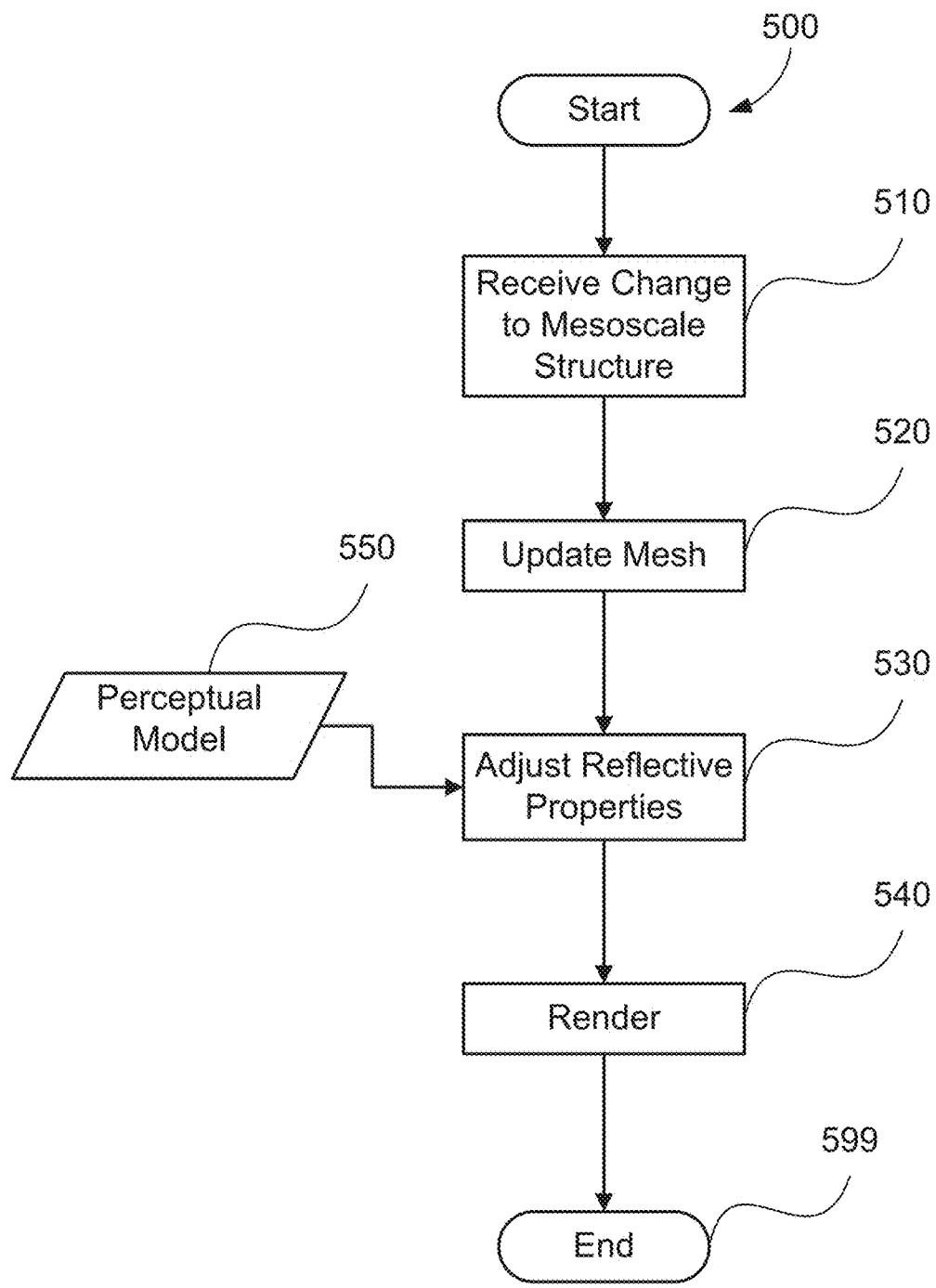
FIG. 5 shows a schematic flow diagram shown an example of a method of modifying material appearance.
Figure 7:
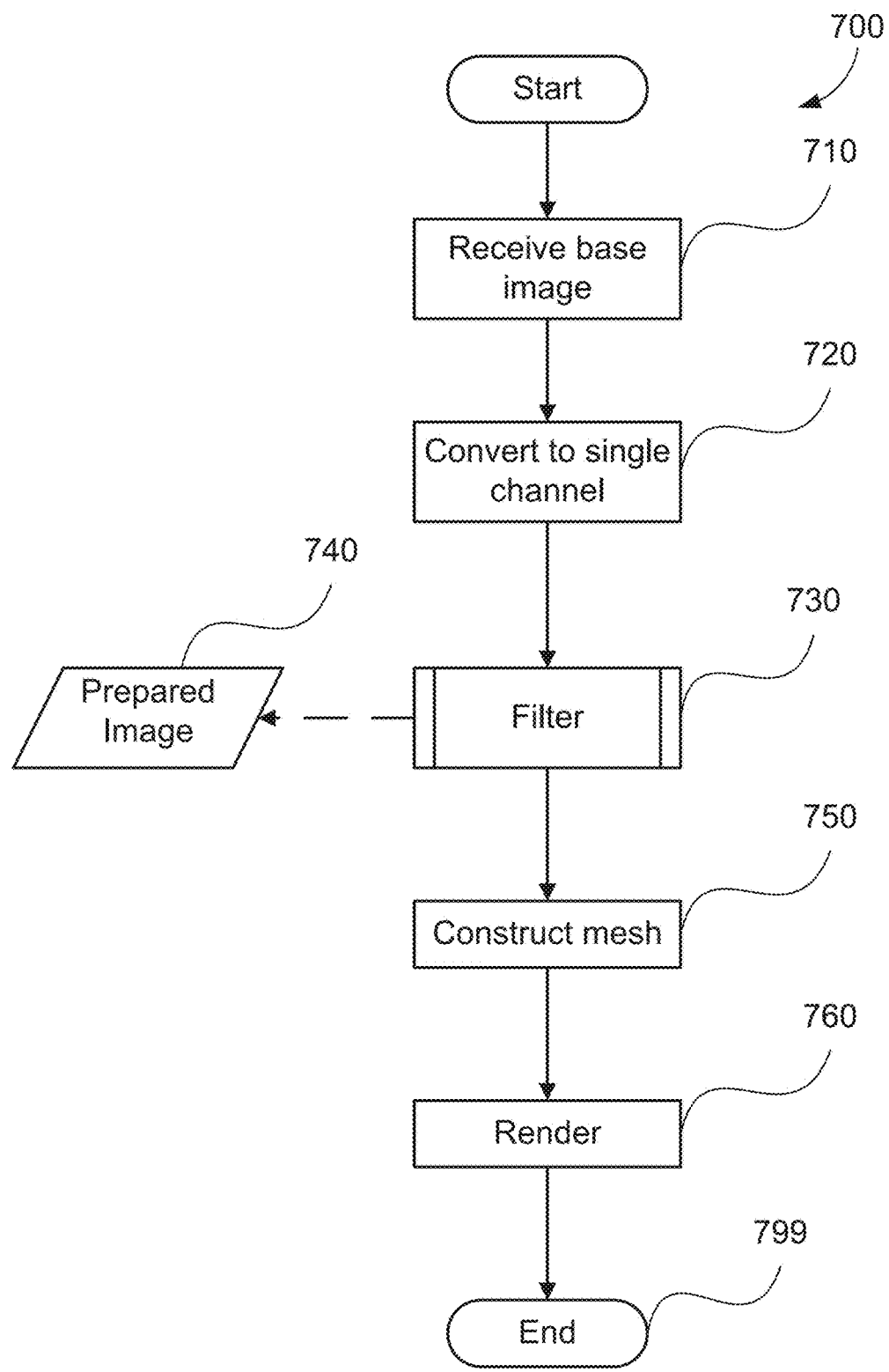
FIG. 7 shows a schematic flow diagram of a method of generating a mesoscale shape of a 2.5D object.
Figure 8:
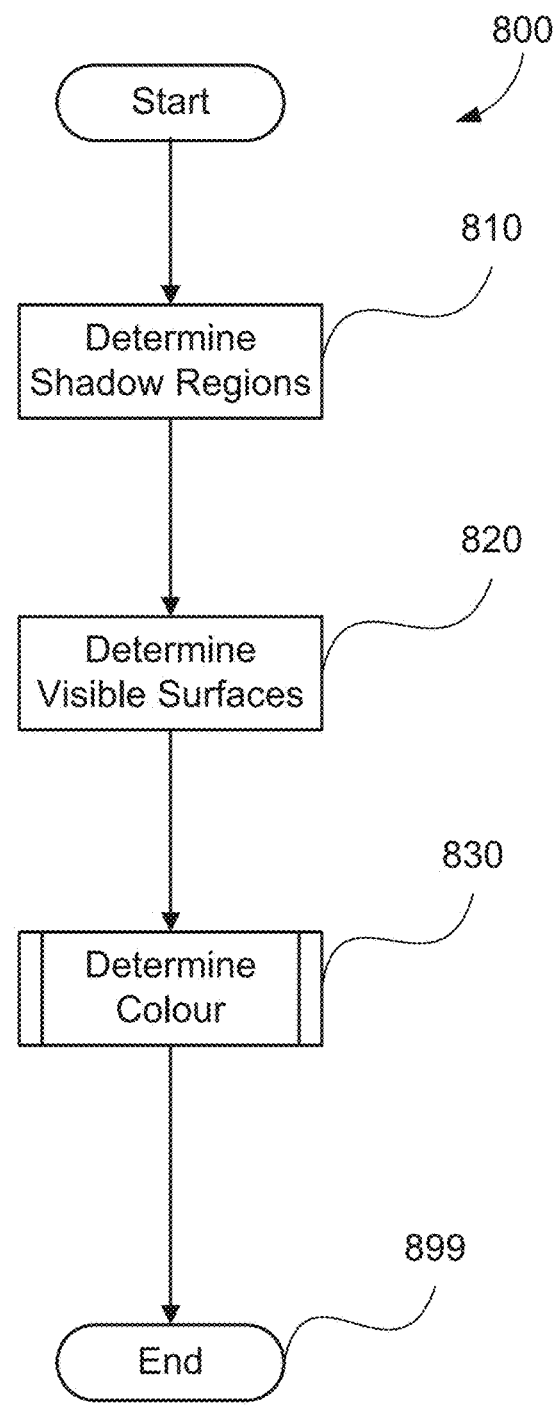
FIG. 8 shows a schematic flow diagram of a method of rendering a digital object.

The methods described herein may be implemented using the computer system 100 wherein the processes of FIGS. 5, 7 and 8, to be described, may be implemented as one or more software application programs 133 executable within the computer system 100. In particular, the steps of the method of FIG. 2 are effected by instructions 131 (see FIG. 2) in the software 133 that are carried out within the computer system 100. The software instructions 131 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 100 from the computer readable medium, and then executed by the computer system 100. A computer readable medium having such software or computer program recorded on the computer readable medium is a computer program product. The use of the computer program product in the computer system 100 preferably effects an advantageous apparatus for rendering a graphical object.

The software 133 is typically stored in the HDD 110 or the memory 106. The software is loaded into the computer system 100 from a computer readable medium, and executed by the computer system 100. Thus, for example, the software 133 may be stored on an optically readable disk storage medium (e.g., CD-ROM) 125 that is read by the optical disk drive 112. A computer readable medium having such software or computer program recorded on it is a computer program product. The use of the computer program product in the computer system 100 preferably effects an apparatus for rendering a graphical object.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCI card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 2 is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1.

When the computer module 101 is initially powered up, a power-on self-test (POST) program 150 executes. The POST program 150 is typically stored in a ROM 149 of the semiconductor memory 106 of FIG. 1. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1 must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 2, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1. The execution of a set of the instructions may in some cases result in output of data. Execution may also involve storing data or variables to the memory 134.

The arrangements described use input variables 154, which are stored in the memory 134 in corresponding memory locations 155, 156, 157. The described arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 2, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a fetch operation, which fetches or reads an instruction 131 from a memory location 128, 129, 130;

a decode operation in which the control unit 139 determines which instruction has been fetched; and an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 5, 7 and 8 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The method of rendering a graphical object may alternatively be implemented in dedicated hardware such as one or more integrated circuits performing the functions or sub functions of the arrangements described. Such dedicated hardware may include graphic processors, digital signal processors, or one or more microprocessors and associated memories.

Figure 10:
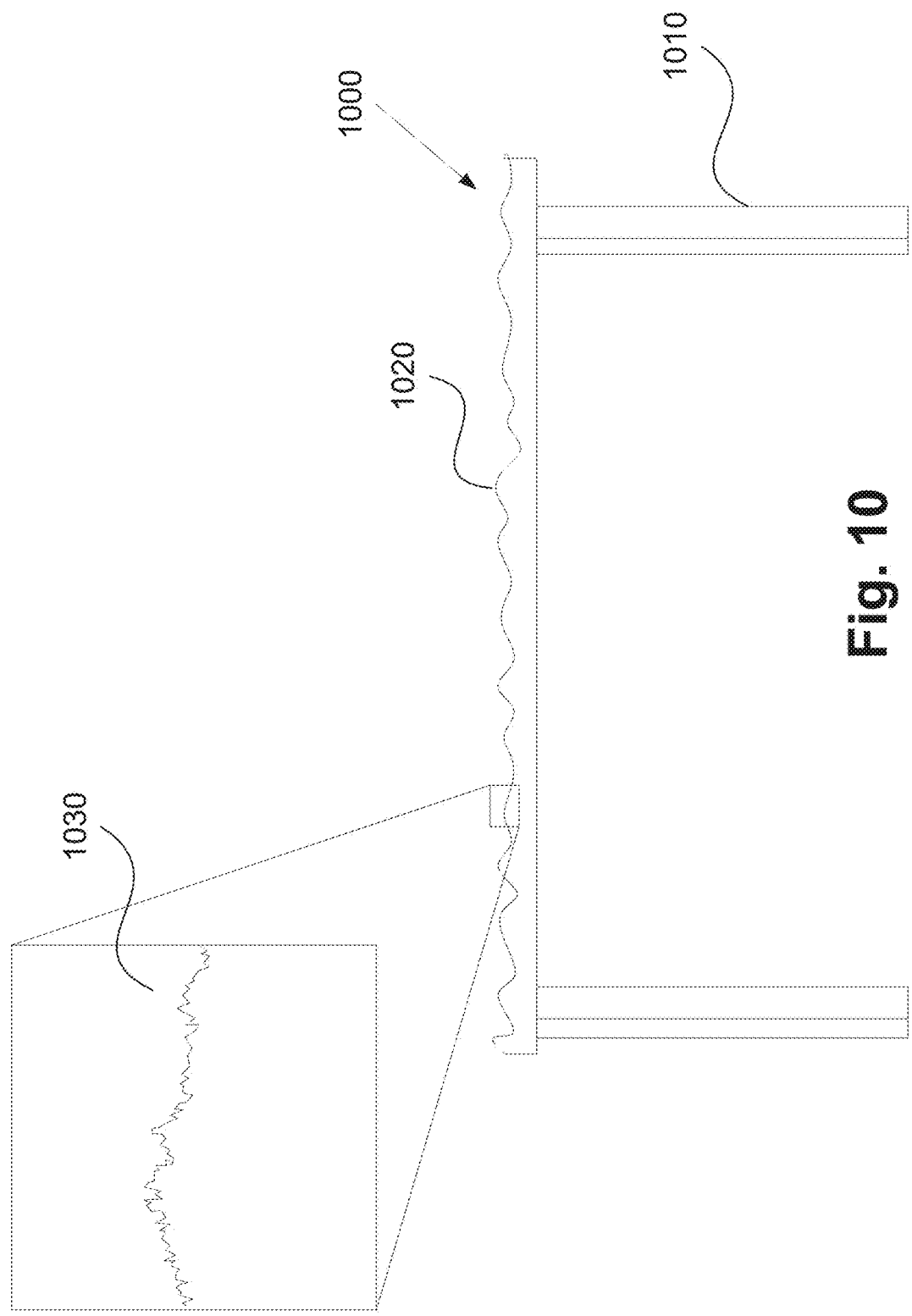
FIG. 10 shows an example of microscale, mesoscale and macroscale geometry of an object.

Shape geometry of an object or surface is considered at three scales: microscale, mesoscale and macroscale. Macroscale geometry refers to the overall (3D) shape of an object. Referring to FIG. 10, the macroscale geometry 1010 of a shape 1000 is that the shape is a table with four legs.

Microscopic scale concerns surface geometry variations that are not visible to the human eye but contribute to the optical properties, such as reflectivity, of a surface, i.e. material being generated. In FIG. 10, an example hypothetical microscale geometry 1030 is shown by zooming in to a particular part of the table, where small scale variation is shown which is not generally visible. The small scale variation gives the table a rougher appearance even though the individual variations are not visible.

Mesoscale surface patterns are spatial variations providing visible cues and defining the coarseness of a surface, e.g. grains of sand/wood, texture of a strawberry, coarseness of a brick. In FIG. 10, mesoscale geometry can be seen on a top surface 1020 of the table 1010. The mesoscale geometry can be seen where there is visible bumpiness to the surface. Mesoscale can be defined as the scale at which variations are visible (upon close inspection), but do not change our sense of the overall shape of the object.

Specifically, mesoscale can typically be differentiated from microscale by whether variations are visible. For a real object, visibility may depend on viewing conditions, but mesoscale would be the scale at which variation is visible to the naked eye given the viewing conditions. For a rendering system, mesoscale is the scale at which variation in the shape is explicitly modeled in the object geometry such as the mesh itself or a normal map, while microscale is the scale at which variations are only considered in aggregate, such as by the reflective properties of the surface. Microscale variations, such as specular roughness, may be stored either as a global value for a material or as a texture map accompanying the mesh or the normal map. The texture map typically contains 2D array of local values (i.e. one value per pixel) for a particular microscale parameter.

Mesoscale can be differentiated from macroscale by whether the variations are considered part of the overall shape of the object. If, for example, two objects were made of different materials but were as similar in shape as otherwise practical, then the difference between those two objects would be a mesoscale difference. In a rendering system, the macroscale and mesoscale may be represented by a mesh and a normal map respectively. Alternatively macroscale and mesoscale may be represented by a coarse, base mesh and an offset from that mesh respectively. Alternatively, both may be represented by a single mesh structure, but mesoscale changes may be made using operations which approximately preserve the local average position.

Mesoscale patterns are often used to modify the "look and feel" of a material surface, without influencing the overall shape of the object and maintaining fine scale reflective properties of the object. Visibility of mesoscale geometry is dependent on a viewing distance from the object. For example, non-smooth spatial variations on the surface can be visible at a close viewing distance but the surface can appear completely smooth at a longer viewing distance. The description of the light reflectance behaviour can therefore vary with the viewing distance. Humans can recognize material properties of a surface from light reflections on that surface. Light reflections on the surface and therefore optical properties of that surface are affected by both the mesoscale and microscale geometry variations. Mesoscale and microscale geometry variations therefore influence the perception of a surface by a user, including the perceived gloss and perceived colour, for example perceived colour lightness or perceived colour saturation. The effect may also be dependent on the macroscale surface orientation relative to a viewing angle and a light source. For example, a macroscale surface orientation has an effect on perceived colour and perceived gloss. There are also interaction effects between a macroscale surface orientation, mesoscale relief height, and specular roughness on perceived gloss and perceived colour. However, in the context of designing the properties of a material to produce a desired surface appearance, the user will typically set the surface parameters, such as microscale roughness and mesoscale height, to satisfy a target appearance in given viewing conditions defined by a macroscale surface orientation relative to a viewing angle and a light source. A macroscale surface orientation can be determined by averaging the direction of normals of the 3D mesh across a pre-determined area of the surface.

In the context of the arrangements described, a change in mesoscale structure can relate to height, frequency, randomness or flatness. Height relates to a parameter that makes all mesoscale structures higher in a direction normal to the macroscale surface orientation. For example, mesoscale height can relate to relief height of a surface of the table 1000. Frequency at mesoscale relates to density of surface protrusions or bumps. Frequency could be measured by the average distance between local maxima points on the surface. Randomness at mesoscale relates to whether bumps are distributed according to a systematic pattern or in a chaotic, irregular pattern. Randomness could be measured by the variance in distances and angles between adjacent local maxima points. Flatness relates to whether a user perceives a surface to feel flat (although possibly with holes) or smoothly rounded. Flatness could be measured by the curvature of the surface at the local maxima points.

Light reflections of a surface relate to light scattering parameters of the surface, such as reflectivity and roughness of a bidirectional reflectance distribution function (BRDF) function of the material, as described below.

The reflective properties of the surface are represented by a mathematical function. The BSDF (Bidirectional Scattering Distribution Function) describes the interaction between incident light and object surface, i.e. how incident light is structured by the surface or medium. The term 'Bidirectional' refers to the relationship between the incident light direction and reflected light direction. The term 'Scattering' refers to how light incoming from a given direction is distributed by the material and the geometry of the surface. The BSDF includes (1) the BRDF (Bidirectional Reflectance Distribution Function), describing the light reflectance of a surface, (2) the BTDF (Bidirectional Transmittance Distribution Function), describing the light transmission through the surface, and (3) BSSRDF (Bidirectional Sub-surface scattering Reflectance Distribution Function), describing how light enters the material at one point and exits the material at another point. The BSDF reduces to BRDF for purely opaque surfaces. BTDF is necessary for modelling transparent objects. BSSRDF is necessary for modelling translucent objects.

Figure 9:
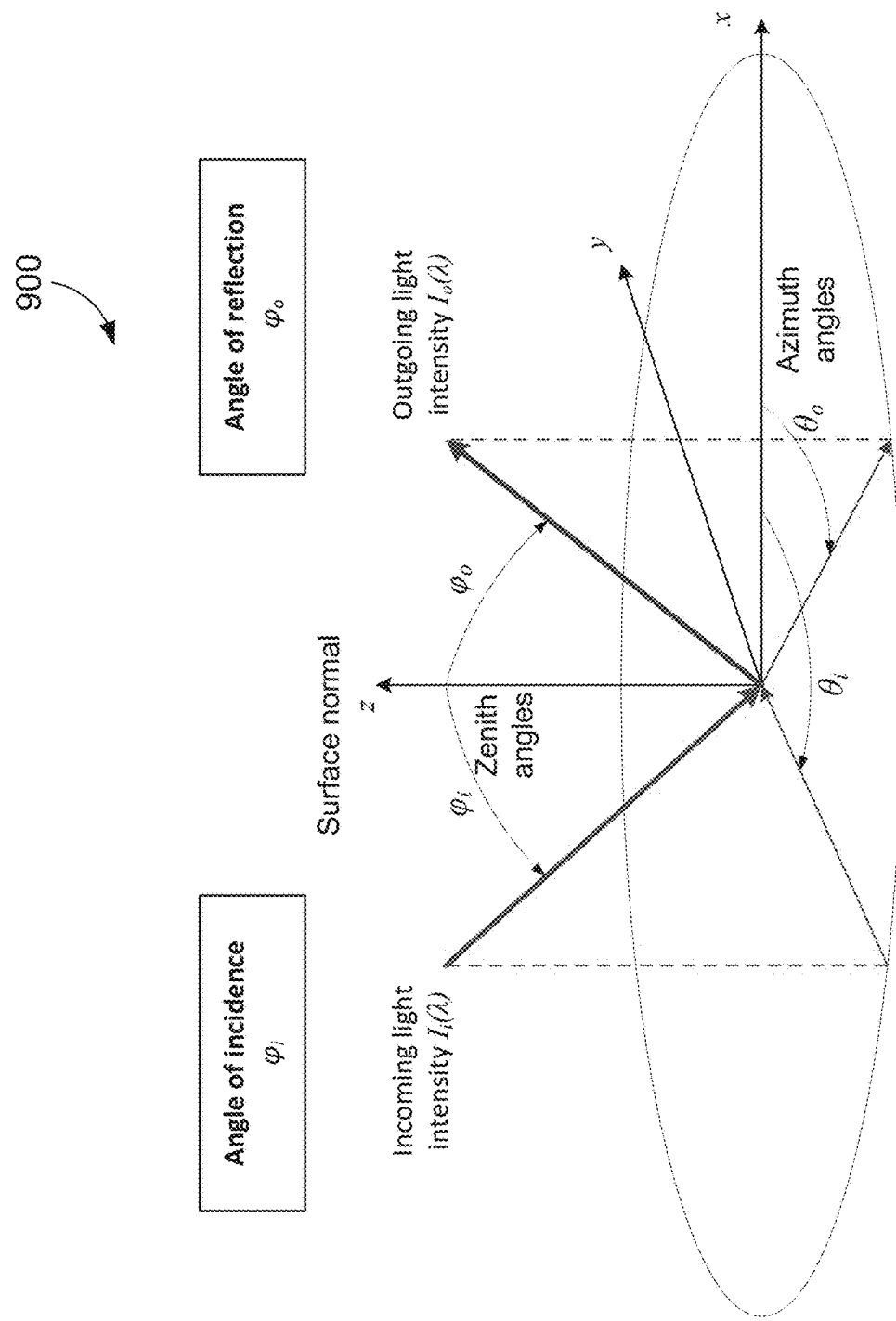
FIG. 9 illustrates parameters of a bidirectional reflectance distribution function (BRDF)

For a printed surface, the BRDF is mostly of interest, and is usually simplified into an analytical function of 4 parameters (ignoring the wavelength of the light or polarisation) expressing the outgoing light as a function of the incoming light. Referring to FIG. 9, BRDF is determined in relation to four parameters, being are azimuth ($\theta_i$) and zenith ($\varphi_i$) angles of direction of incoming light, and azimuth ($\theta_o$) and zenith ($\varphi_o$) angles of viewing direction. The BRDF describes an amount of light reflected on a surface for a given amount and angle of incoming light, when the surface is viewed at a certain angle.

Figure 3:
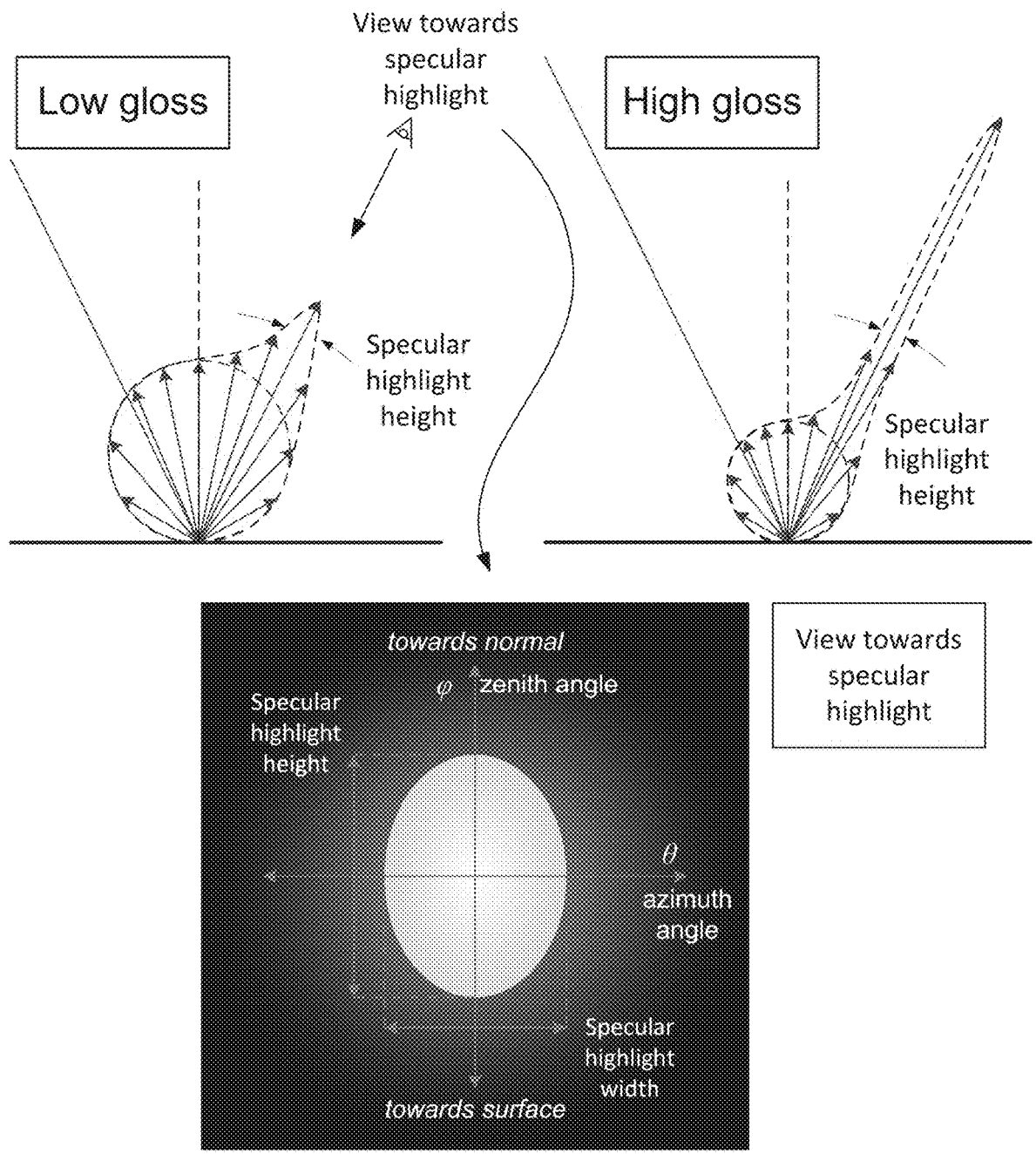
FIG. 3 illustrates specular highlight characteristics affecting gloss.

A BRDF can be measured directly from real objects using an optical measurement device called a goniophotometer. The goniophotometer provides a measurement of the reflected light on a given point of the surface for a given incident light. In order to produce data characterising the reflectance of the surface, the measurement must be repeated at each point of the surface for many illumination directions and viewing directions, or at least be repeated for high sampling points on the surface and values for other non-measured points are then obtained using interpolation. The measurement process is therefore very tedious and time-consuming. However, many analytical models have been proposed to model the reflectance of the surface. A BRDF often includes 2 components. Firstly, a diffuse component models light absorption, subsurface interaction and internal reflections, and results in the colour of the surface. Secondly, a specular component models the direct reflection of light onto the surface, and is related to glossiness or shininess of the surface. The strength and size of the specular reflection are often associated with the glossiness of the surface. The relationship of strength and size of specular reflection with glossiness is illustrated in FIG. 3. As shown in FIG. 3, the greater the specular highlight height with respect to a direction of view of a user, the greater the perceived glossiness by the user.

Reflectance behaviour can be more or less complex depending on the surface characteristics. Different analytical models (e.g. Ward, Cook-Torrance, Ashikhmin-Shirley model) for determining reflectance behaviour are known.

Parameters in the BRDF model refer to physical or mathematical aspects and are difficult to interpret for non-expert users (i.e. people not familiar with the specific BRDF model). The BRDF parameters do not translate easily into perceptual appearance characteristics, such as glossiness.

In the arrangements described, a BRDF model consisting of two components is used. One component is referred to as diffuse, and the other component as specular. The output colour is a linear combination of the diffuse and specular components. A ratio of a weight of the diffuse component to a weight of the specular component provides a parameter of the BRDF model referred to as the "specular ratio". The sum of the two weights should be equal to 1. Accordingly, a material which reflects all of the incoming light can be included, while also ensuring that the total amount of reflected light is never more than the incident light. The output colour is multiplied by the colour and intensity of the light source to get the actual rendered colour.

The diffuse component includes the colour of the material. The colour of the material is stored as a texture image. For a 2.5D system, the texture image maps directly to the two dimensional plane. For a 3D surface, a parameterisation is required. The parameterisation maps the surface of the 3D object to two parameters, which in turn correspond to the x and y axis of the texture image. Thus each point on the surface of the object has a corresponding location in the texture image. The corresponding location in the texture image in turn defines the diffuse colour of the associated point on the surface. The diffuse component typically uses a Lambertian rendering model. In other words, the diffuse component describes Lambertian reflectance, which is viewpoint-independent reflectance generated by the orientation of surface normals relative to the light source.

The specular component is white, matching the behaviour of many materials which have a diffuse colour but white specular reflections. The specular component describes the viewpoint-dependent reflectance generated by the orientation of surface normals relative to both the viewing direction and the incident lighting. The specular component is determined using a microfacet model. A microfacet model is based on an idea that the microscale surface consists of a collection of small, perfect reflectors. Light is reflected in a particular direction only by the microfacets facing at the appropriate angle for that reflection, and the proportion of microfacets in each direction corresponds to the proportion of light reflected in that direction. Mathematically, the microfacet model has form of Equation (1):

$$\rho_s(L, V, N, X, Y) = \frac{F(R_s, \langle H, V \rangle) p_h(N, H, X, Y)}{g(L, N, V)} \quad (1)$$

In Equation (1), $\rho_s$ is the value of the specular component. The inputs to Equation (1) are a set of vectors L, V, N, X and Y. The vector N represents the unit normal to the surface at the current location. The vector L is a unit vector pointing from the surface towards the light source. The vector V is a unit vector pointing from the surface towards the location of the viewer (i.e. a virtual camera). The vectors X and Y represent the normal and binormal. The vector X can be any vector which is tangent to the surface (i.e. perpendicular to N). The specific direction X points in will influence any anisotropic behaviour of the material. For a 2.5D system, the vector X should point in a direction perpendicular to the y axis. For a 3D system, the vector X should point in the direction corresponding to the direction of maximum gradient at each point on the surface for one of the two parameters in the same parameterisation used for the texture image. The vector Y is a unit vector perpendicular to both N and X. Equation (1) also uses the half vector H, being a unit vector equal to the normalised sum of the vectors V and L. The vector H represents the direction which would be normal to a mirror which reflects light directly from the light source L to the viewer V. The denominator g(L,N,V) is a term added to account for occlusions between microfacets.

The microfacet model of Equation (1) contains three terms. A first term $p_h$ represents a distribution of microfacet angles relative to the normal. The term $p_h$ is the main term determining the shape of the specular reflections. In one arrangement, a microfacet distribution according to Equation (2) is used:

$$p_h(N, H, X, Y) = \frac{(n+1)(N \cdot H)^n}{2\pi} \quad (2)$$

Equation (2) includes a parameter n, which corresponds to the roughness of the surface at a microscale level. For large values of n, the microfacets are almost all aligned closely to the surface normal, while for small values of n the microfacets are distributed more evenly across different angles. Smooth surfaces have a correspondingly small but bright specular highlight, while rough surfaces have a more broadly spread highlight. A number of different mathematical forms have been considered for microfacet distributions, or for BRDF distributions more generally. Almost all of the different mathematical forms include a parameter playing a similar role of determining an apparent width of the specular highlight. Any of the mathematical approaches could be used in place of the arrangements described herein.

The term F represents a Fresnel reflection term. The term F models the amount of light reflected depending on the angle of incidence to the microfacet. The term F is derived from the Fresnel equations, or alternatively an approximation may be used. The term F includes a reflectivity parameter $R_s$. The reflectivity parameter is roughly associated with the proportion of light reflected specularly. More specifically however the reflectivity parameter is the proportion of light reflected specularly for incident light at close to the normal angle. At a glancing angle, close to all the light is always reflected specularly, according to Fresnel's equations. This parameter $R_s$ is, in theory, related to the refractive index of the material by Equation (3):

$$R_s = \frac{(n_1 - n_2)^2}{(n_1 + n_2)^2} \quad (3)$$

In Equation (3), $n_1$ is the refractive index of the material and $n_2$ the refractive index of air $\sim$=1.000293.

Gloss is an important aspect of material surface appearance. Physical gloss is measured in Gloss Units (GU). Gloss units are defined relative to the reflection of polished black glass with a refractive index of 1.567 (compared to air's refractive index of 1.000293), measured at 60° to the surface normal. The polished black glass standard is given the value of 100 GU. Gloss meters measure the amount of specular reflected light, by determining the ratio of reflected light to the incident light for the opposite angle as defined by the ISO standard 2813 "Paint and varnishes—Determination of gloss values at 20°, 60° and 85°" and ISO standard 7668 "Anodized aluminium and aluminium alloys—Measurement of specular reflectance and specular gloss at angles of 20°, 45°, 60° or 85°". The opposite angle refers to an angle opposite to an angle of incident light with relative to the normal of the surface. For example if incident light is 30 degrees relative to the normal, then the measuring device is positioned at 30 degrees on the opposite side of the normal.

It is important to distinguish the concept of "physical gloss" from the concept of "perceived gloss or glossiness". Physical gloss is measurable in physical objects, or determined entirely by the BRDF of the material in a rendering system. Perceived gloss or glossiness is a perceptual interpretation of a material, and may depend on other factors including the viewing conditions, mesoscale structure of the material, and the viewer themselves. As described below, roughness (specular roughness) is a physical parameter of a surface that influences the physical gloss of the surface. Changes in physical gloss produce in turn a change in perceived surface appearance, i.e. how humans perceive the change of physical characteristics, such as perceived gloss. As such, perceived gloss or glossiness is the perceptual response of the human visual system processing the light information related to physical gloss coming from the object's surface. Specular roughness is found to be negatively correlated with perceived glossiness for a wide range of mesoscale relief heights. Perceived glossiness is also affected by the mesoscale relief height of the surface. Perceived glossiness can be affected by viewing conditions, including the macroscale surface orientation relative to the viewing angle and light source. For example, perceived glossiness can be lower for surfaces with lower relief heights that are more frontally than obliquely oriented relative to the light source. In a typical scenario where a user designs the surface of an object, the user wants to set the parameters of the surface so to obtain a desired surface appearance for a typical viewing angle set by the usage of the object. The user will therefore set the parameters of the material to achieve a desired appearance for a particular macroscale surface orientation relative to the viewing angle and light source.

It is known from scientific literature, such as Obein et al. (2004) "Difference scaling of gloss: non-linearity, binocularity and constancy" and Ji et al. (2006) "Gloss as an aspect of the measurement of appearance" that a non-linear relationship exists between physical level of gloss and human perception of gloss. For design of an object and the object's surface appearance, perceived gloss is more important than the physical value of gloss in GU. A simple measure of physical gloss cannot fully describe the different perceptual aspects of gloss, such as specular gloss, contrast gloss or distinctness of gloss as defined by Hunter "Methods of determining gloss", Research Paper RP958, Journal of Research of the National Bureau of Standards, Volume 18, and January 1937. Perceived gloss can also be predicted from information of specular highlights, i.e. by determining a proportion of a surface that appears to be covered by specular reflections.

Roughness can be defined as an amount of variation in surface texture. The appearance of physical texture is strongly dependent on the scale of the roughness variations, including whether the variations are at the microscale or the mesoscale. Roughness can be modelled at both the microscale and mesoscale levels. At microscale level, texture variations are not visible without magnification but influence the optical properties of the surface. The smoother the surface (weaker roughness), the greater the amount of specular reflection, and the glossier the surface appears. Conversely, the rougher the surface, the more diffuse the surface appears. Microscale roughness or specular roughness can be used in a BRDF model as a parameter of the reflection properties. Microscale roughness or specular roughness is referred to as simply roughness for the purposes of the present disclosure.

Roughness at the mesoscale level corresponds to physical texture of the material, and is referred to as bumpiness for the purposes of the present disclosure. Adding bumps to a surface at a mesoscale gives the surface a rougher appearance. However, a bumpy material may also still appear glossy if the surface is smooth at the micro scale. Mesoscale height variation is commonly used to refer to surface geometry.

Some BRDF models are based on the concept of a microfacet distribution model. In a microfacet distribution model, a surface is composed of tiny microfacets (microlevel surfaces with individual orientations) and each of the microfacets reflects light in a direction based on its normal. If all or most microfacets are identically oriented, corresponding to low roughness, the incoming light creates a strong specular highlight in the reflected light. Conversely, if microfacets have a wide distribution of orientations, corresponding to high roughness, the light is reflected in many different directions, thereby creating a more diffuse light reflection.

Ho et al. "Conjoint measurement of gloss and surface texture" (in Psychol. Sci., 2008); 19(2): 196-204, shows that an increase of surface bumpiness leads to increase of perceived gloss and that an increase of gloss increases perceived bumpiness. Qi et al. "The joint effect of mesoscale and microscale roughness on perceived gloss", Vision Research 115 (2015) 209-217, describes that perceived gloss varies monotonically with microscale roughness, that perceived gloss varies non-monotonically with mesoscale relief height, and that the joint effect on perceived gloss of microscale roughness and mesoscale relief height is non-linear.

Figure 6:
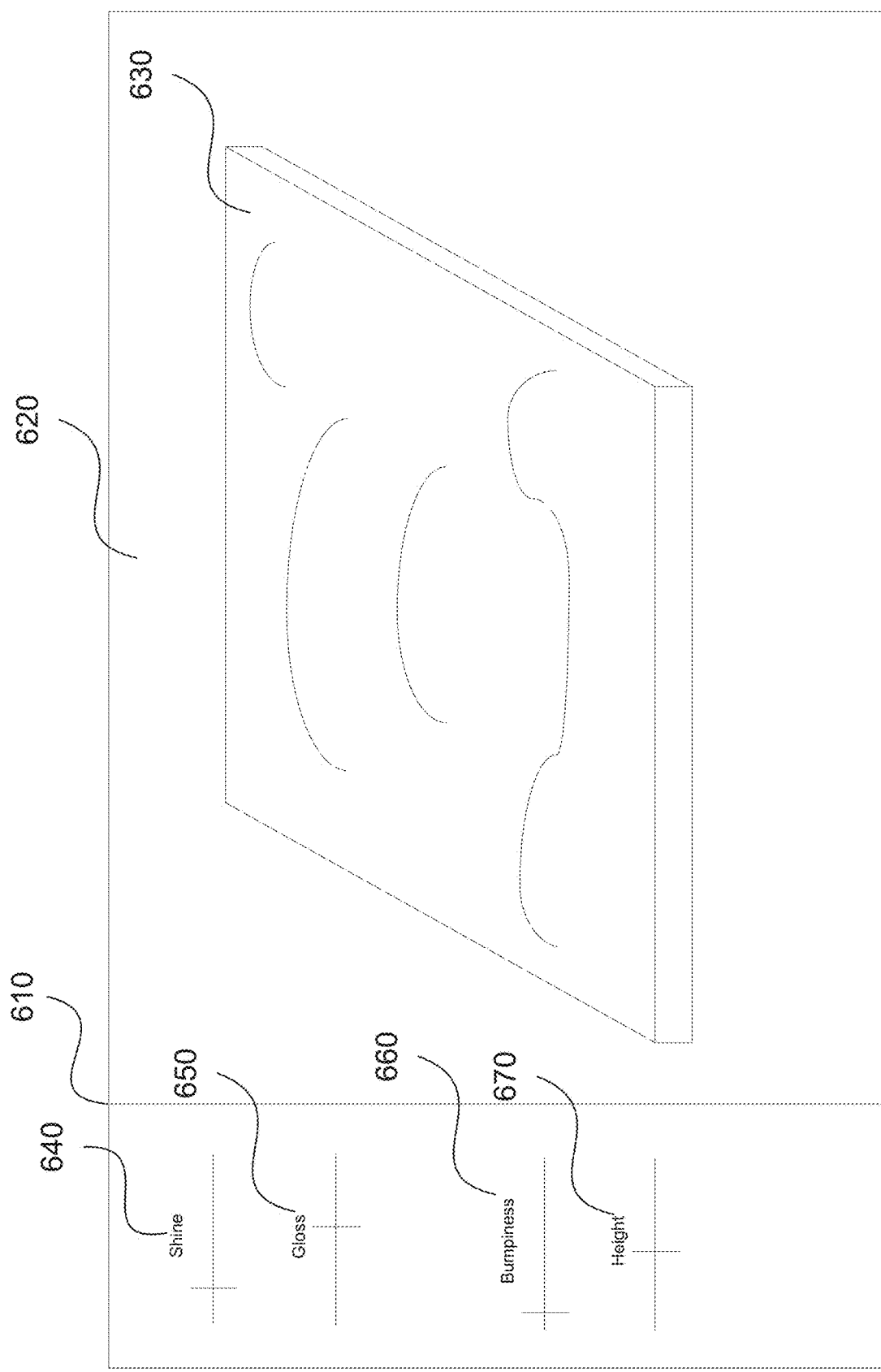
FIG. 6 shows an example of a user interface implementing the method of modifying material appearance.

FIG. 6 shows an image 600. The image 600 represents a screenshot of an example user graphical user interface (GUI) 610 reproduced on the display 114. The GUI is reproduced, for example on the display 114, by execution of the application 133. FIG. 6 shows examples of elements of the user interface 610 for modifying the appearance of a material.

In a centre window 620 of the interface 610 is a rendering 630 of an object formed of the material. On the left of the interface 610 are controls 640, 650, 660 and 670 for modifying the appearance of the material. The two controls 640 and 650 are used to modify the reflective properties of the material. The two controls 660 and 670 are used to modify the physical shape of the material at a mesoscale. The object 630 shown in the window 620 is a 2.5D object. A 2.5D object in the context of the arrangements described represents substantially flat object with variations in height. Specifically, the macroscale shape of the object is entirely flat, but mesoscale variation in height provides a material texture. The object 630 is predominantly a 2D flat, square shape, but with some relief height added, as influenced by the controls 660 and 670.

The controls 640, 650, 660 and 670 are preferably presented as sliders, as shown in FIG. 6. In other arrangements, other control mechanisms such as dials, buttons and the like, can be used. The controls 660 and 670 relate to mesoscale structure bumpiness and height respectively. Bumpiness can relate to frequency. In other arrangements additional controls for mesoscale structures such as frequency and flatness can be included in the GUI 610.

The controls 640 and 650 relate to perceptual appearance characteristics perceived gloss and shine. In other arrangements addition or alternative controls can be included for other characteristics such as colour, sparkle, grunge and the like.

FIG. 7 shows a method 700 of generating a mesoscale shape of a 2.5D object, such as the object 630. The method 700 is typically implemented as one or more modules of the application 133 stored in the memory 106, and controlled by execution of the processor 105.

The method 700 starts at a receiving step 710. At the step 710, a base image for generating the height is received. The base image may be the same image used for the colour texture as the object, or may be a different image loaded by the user, for example via the disk drive 112. The base image may alternatively be received from a remote device via the network 120. The base image can be a captured photographic image or an artificial image. A height map may also be received at execution of step 710, as a known height map such as from physically scanning an object, or as prepared in a 3D graphic design tool.

The method 700 progresses under execution of the processor 105 from step 710 to a converting step 720. In execution of step 720, the base image received at step 710 is converted to a single channel. If the base image is already a single channel image, step 720 is not required. For a colour image, the luminance of the image may be used.

The method 700 progresses under execution of the processor 105 from step 720 to a filter step 730. In execution of step 730, the single channel image is filtered, for example by a high-pass, low-pass or band-pass filter. The filter used at step 730 is designed to make the resulting shape better match the user's intention. To allow the user to customise the shape, the filtering is influenced by parameters set by user interaction with the user interface, for example using the inputs 113 to interact with the interface 610. Filtering may be performed in Fourier space, i.e. by modifying a Fourier transformed image, then applying the corresponding inverse Fourier transform to the modified Fourier transformed image. In some arrangements, for efficiency, a copy of the base image after converting to one channel and performing a Fourier transform may be stored for later use as a prepared image 740. The prepared image can be stored on the memory 106 for example.

In arrangements using a scanned or designed base image, the filtering step 730 may be skipped in order to preserve the original values of the base image. Alternatively, filter parameters may be chosen such that the filtering has no impact. In arrangements using a scanned image however, some low pass filtering may still be desirable to smooth the output of a potentially noisy scan.

The method 700 progresses under execution of the processor 105 from step 730 to a construction step 750. In execution of step 750, a mesh is constructed based on the filtered image of step 730. The mesh consists of a point for each pixel in the filtered image. The x and y co-ordinates of the mesh are equal to the corresponding pixel location in the image. The z co-ordinates of the mesh are equal to the value of the filtered image from step 730 multiplied by a height scale value. The height scale value represents a ratio between the filtered image value and the physical displacement of the resulting mesh. The height scale value is a parameter which may be controlled by the user. An option may also be provided to the user to invert the height scale parameter, so that brighter areas may appear at lower heights instead of higher.

The faces of the mesh form two triangles for each region in between four adjacent pixels, that is two triangles for each group of pixels of the form (x, y), (x+1,y), (x+1,y+1), (x,y+1). Alternatively, the mesh may consist of four triangles for each group of four adjacent pixels by including an additional mesh point in the centre of the four points.

If the filtering step 730 was skipped, the mesh constructed in step 750 is based on the single channel image of step 720.

The method 700 progresses under execution of the processor 105 from step 750 to a rendering step 760. In execution of step 760 the object is rendered using the newly constructed mesh from step 750.

FIG. 8 shows an example method 800 of rendering an object as implemented at step 760, to give context to the rest of the description. Many methods of rendering are known and alternative approaches may be used. The method 800 is typically implemented as one or more modules of the application 133 stored in the memory 106, and controlled by execution of the processor 105. The method 800 is used to render the mesh constructed at step 750 of FIG. 7.

The rendering environment of the method 800 includes a point source light, and a surrounding environment. The steps of the method 800 of rendering a particular image to be displayed in the rendering window 620 are described with reference to FIG. 8.

The method 800 starts at a determining step 810. At step 810, regions of the object which are in shadow relative to the direct light source are determined. The regions in shadow are determined by determining the visible surfaces from the point of view of the direct light source. The method used at step 810 is the same as the approach described below for step 820, except that the location of the light source is used as the view location. As a result, the areas of the mesh which are visible to the light source are identified, and the remaining areas are in shadow. Parts of the object are then marked with whether or not they are visible to the light source for use in future rendering steps.

After determining shadow regions, the method 800 moves under control of the processor 105 from step 810 to step 820. Execution of step 820 determines, for each pixel in the rendering window 620, which part of the object 630 is visible at that pixel. In order to determine the part of the object visible at each pixel, first every vertex of the object mesh is transformed into screen co-ordinates wherein the screen co-ordinates, the x and y values are the position the vertex would be seen at on the screen from the point of view of the virtual camera. The z value relates to the distance of that vertex from the virtual camera. Then, for each face of the mesh which is facing and in front of the camera, a value identifying the face is drawn onto a buffer, where one face is only drawn over another if the face is closer to the virtual camera. This buffer then identifies the closest visible face for each screen pixel. Parts of the buffer where no face was drawn represent where the object is not present.

Having determined the visible surface for each screen pixel, the method 800 progresses under control of the processor 105 from the step 820 to a determining step 830.

The step 830 executes to determine the rendered colour for each pixel. Parts or pixels of the screen 114 where the object is not visible are rendered according to the background environment. The pixels of the screen 114 that correspond to the object are rendered according to what is referred to as a fragment shader. The fragment shader determines the rendered colour according to the face normal, the shadow information determined at step 810, and the modelled reflective properties of the material. The fragment shader further determines the rendered colour according to the parameters of the reflective model, including global parameters and the local value of parameters which vary over the object surface.

The resulting colour for each pixel is then drawn onto the screen 114, completing the rendering method 800.

Referring to FIG. 6, user interface 610 desirably uses terms with which ordinary people (non-experts) are familiar. However, there is a disconnect between the terms non-experts are familiar with and the mathematical parameters which may be used in rendering engines or algorithms for automatically generating or modifying mesoscale physical structure. To address the disconnect, perceptual models are used.

A perceptual model is represented as a function receiving as input a set of parameter values. The perceptual model can also, optionally, receive a set of features summarising more complex varying information, such as the entire colour texture image, as input. The perceptual model outputs a value representing an approximate expected abstract experience. Some example outputs may be a sense of glossiness, bumpiness, or the perceived object colour (as potentially distinct from the rendered diffuse colour).

Figure 4:
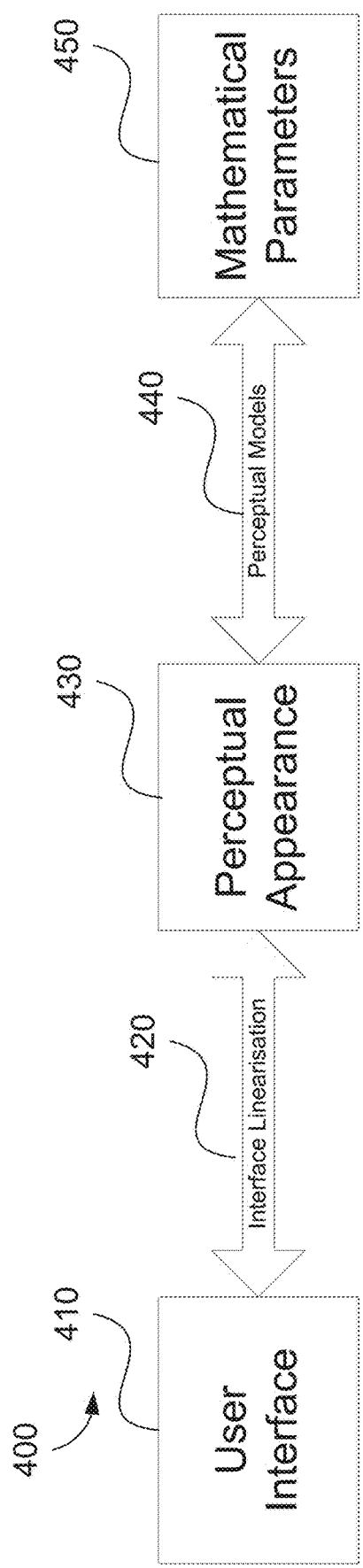
FIG. 4 shows relationships between a user interface and modifications in structure of a graphical object.

FIG. 4 shows a set of relationships 400 between graphics interfaces and mathematical parameters in accordance with the arrangements described. A user interface 410 (such as the GUI 610) is related by an interface linearization 420 to a perceptual appearance 430, comprising a number of appearance characteristics such as gloss, colour and the like, of a material. The interface linearisation 420 represents relationships between adjustment of the sliders (e.g., 640-670) of the interface 610 to actual resultant characteristics. The perceptual properties 430 are related to mathematical parameters of the application 133 by one or more perceptual models 440.

The perceptual model 440 effectively provides a mapping relating a mesoscale structure and at least one light scattering parameter, such as reflectivity or roughness, of a material to a perceptual appearance characteristic. The relationship between how parameters are adjusted by the user and resultant visual effects of material appearance can be monotonic or non-monotonic or difficult to predict to the user. The arrangements described use a perceptual model to provide a relationship between the parameters and the appearance that can be relatively easily understood by the user.

FIG. 5 shows a method 500 of rendering a graphical object. The method 500 is typically implemented as one or more modules of the application 133 stored in the memory 106, and controlled by execution of the processor 105. The method 500 is performed in response to the user modifying a user interface control which impacts the mesoscale structure of the object.

The method starts when a graphical object is reproduced for the user to view via an interface, such as the GUI 610. The graphical object can be reproduced by execution of the method 700, for example, using an initial mesoscale structure. The method 500 starts at a receiving step 510. In execution of step 510 the application 133 receives a desired modification to the structure of the object. The modification is typically received by a user interacting with controls (such as the controls 660 and 670) of a user interface (such as the interface 610). The application 133 receives a signal indicating the modification in structure via the GUI 610. The received modification to the physical shape relates to the initial mesoscale structure of the object, such as modification to bumpiness and height using the controls 660 and 670.

The corresponding change in height generation parameters required to give the desired change or modification in shape is determined at step 510. Determining the change in height parameters may be computationally relatively simple if the interface maps directly to the height map generation parameters, such as with typically with an easily understood parameter such as "height". In some cases, determining the change in height parameters may be relatively complex, for example involving a non-linear mapping for more complex parameters such as "bumpiness". Given the received change to parameters, the prepared image 740 is retrieved for example, and remaining filtering as described in relation to step 730 of FIG. 7 performed.

The method 500 progresses under execution of the processor 105 from step 510 to an updating step 520. In execution of step 520, the mesh representation of the graphical object (such as the object 610) is updated according to the new height map. The mesh representation of the object is updated at step 520 in a manner identical to step 750 of FIG. 7.

The method 500 progresses under execution of the processor 105 from step 520 to an adjusting step 530. In execution of step 530, the reflective (or light scattering) parameters of the material are adjusted according to the updated mesh generated in step 520 so as to maintain a particular perceptual appearance characteristic, such as perceived gloss, of the object. In order to perform the adjustment of the reflective parameters, a perceptual model 550 (similar to the model 440) is used at step 530. The perceptual model 530 relates to a mapping from properties of the height map and reflective (light scattering) parameters to perceptual characteristics of the material. The perceptual model 550 is specific to the combinations of physical properties and reflective properties of the particular material being considered. Execution of steps 520 and 530 effectively adjust a light scattering parameter to form a modified mesoscale structure (reflected in the updated mesh) of the graphical object and preserve a perceptual appearance characteristic such as perceived gloss.

In one arrangement, the perceptual model operates to preserve the perceived glossiness of the material over changes in the height of the material. According to the model preserving perceived glossiness, the perception of gloss changes as the overall height of the mesoscale structure changes. In order to preserve the perceived gloss, the roughness parameter is adjusted such that the perceived gloss remains constant, according to Equation (4):

$$n = e^{(0.394\ log(0.47 height + 10) - 0.576)g} \quad (4)$$

In Equation (4), n is the roughness value as used in the microfacet model, that is the roughness of the related BRDF mode, and height is the value of the height adjustment parameter described above in relation to step 750 of the method 700 for converting the filtered image values into z values in the resulting mesh. The value g of Equation (4) represents the perceived glossiness of the material that the equation is trying to preserve. The scale of g is arbitrary. However, in the case of Equation (4) g is taken to be a value in a range from 0 (no perceived gloss) to 15 (maximum perceived gloss), according to the judgements of observers in a psychophysical experiment. According to Equation (4), perceived gloss varies with variation of roughness, variation of relief height, and joint variation of roughness and relief height. In one arrangement of the method 500, the perceptual model of Equation (4) is derived from averaging psychophysical data over different macroscale surface orientations. In another arrangement of the method 500, the perceptual model is derived from psychophysical data for a specific macroscale surface orientation. If a specific macroscale surface orientation is used to determine perceived gloss, then the method 500 can be modified, for example, by selecting coefficients for the model of Equation (4) based on macroscale surface orientations. As such, the surface can be subdivided into a plurality of predetermined areas, each of which having a corresponding local macroscale orientation. A local perceived glossiness value can be determined for each of the predetermined areas based on a corresponding local macroscale orientation relative to a viewing angle and a light source. In that case, the local perceived glossiness value can be maintained at step 530 for each of the predetermined areas by adjusting reflective (light scattering) parameters associated with the predetermined area in response to change in the mesoscale structure received at step 510. In another arrangement, the diffuse colour of the material is also modified to preserve the perceived colour of the material in response to a change in mesoscale structure such as the height adjustment parameter or frequency. In this instance, the light scattering parameter relates to diffuse colour (the colour used for rendering), and the perceived colour relates to a perceptual characteristic observed by a user. Sharp specular highlights may provide contrast which makes the material's own colour stand out more. Conversely, the specular term on a very rough material may result in a pale white haze over the entire visible surface of the material, resulting in the colour of the material being perceived as more washed out. These effects are in turn dependent on the mesoscale structure.

The desired colour of the material may be defined by the diffuse colour image, i.e. an image provided by the user specifying the desired colour of the material at each point. Alternatively, especially for a material of a uniform colour, the colour may be specified with a colour selection device in the user interface. In either case, care should be taken that the effects which this arrangement is adjusting for are not also present in the interface for choosing the colour. The colour selection is done in a specified colour space. The colour processing is then performed in the same colour space, as described below.

In response to a change to the mesoscale structure, the diffuse colour as used in the rendering 800 is adjusted so as to ensure that the perceived colour is the specified desired colour. To ensure that the perceived colour is the specified desired colour, a perceptual model is used that relates the height adjustment parameter, the roughness, the diffuse colour, and the perceived colour. The model is expressed in the specified colour space. In one arrangement, the colour space is the HSV colour space, where H represents the hue, S represents the saturation and V represents the value of the colour. An example of the perceptual model is given in given in Equations (5) and (6):

$$s_{adj} = s_{in}\left(1.39 - \frac{0.39}{1 + 0.72e^{-(5.7-n-10.7\ height)}}\right) \quad (5)$$

$$v_{adj} = \frac{v_{in}}{0.40\ height + 0.065n + 0.6} \quad (6)$$

In Equation (5), $s_{in}$ is the saturation value of the diffuse colour, and $s_{adj}$ is the adjusted saturation value. Similarly in Equation (6) $v_{in}$ is the luminance value of the diffuse colour, and $v_{adj}$ is the adjusted luminance value. In both equations (5) and (6), height represents the relief height. According to Equations (5) and (6), perceived colour saturation and value vary with variation of roughness, variation of relief height, and joint variation of roughness and height. Other representations of colour (e.g. in other colour spaces), such as CIE LCH, can also be used, in which case relationships similar to Equation (5) and (6) can be correspondingly determined in that colour space. In one arrangement of the method, the perceptual model of Equations (5) and (6) is derived from averaging psychophysical data over different macroscale surface orientations. In another arragement of the method, the perceptual model is derived from psychophysical data for a specific macroscale surface orientation and is used in a similar manner as discussed with references to Equation (4).

Using the perceptual model, a new diffuse colour is chosen at step 530. The new diffuse colour is different from the colour texture of the object, such that instead the modelled perceived colour matches the colour texture of the object.

A number of other interactions between physical and reflective properties could be considered. For example, the randomness of the mesoscale structure may have an influence on the perception of sparkle or grunge. The dominant frequency or frequencies of the mesoscale structure may also have an influence on the perceived colour or glossiness. The flatness of the mesoscale structure may have an influence on the perception of sheen. Many other combinations can be considered. In order to build an embodiment including each interaction, a corresponding perceptual model 550 needs to be constructed.

The process of creating the perceptual model 550, such as the examples given in Equations (4), (5) and (6), is now described. First, it is necessary to identify a high level perceptual concept or characteristic which the user may wish to adjust, along with a set of physical and reflective properties which may influence the perceptual appearance characteristic. Having a reflective property with a strong and direct influence over the high level perceptual appearance characteristic is suitable, preferably a reflective property with minimal side effects. This property may be used to adjust the perceptual appearance characteristic in response to changes to other influencing factors. For example, as described above, the roughness parameter of the BRDF has a strong and direct influence over perceived glossiness and may be adjusted to preserve the glossiness in response to changes to other influences such as the relief height.

Given a high level perceptual appearance characteristic and a set of properties which may influence the perceptual appearance characteristic, an experiment can be designed. In the experiment, the observers are shown a set of stimuli. Each stimulus is a material rendered according to a particular combination of parameters. The combinations of parameters should be such that the parameters sufficiently cover the range of values which could be taken by the set of influencing properties.

The user provides a response for each stimulus based on their observation of the stimulus. A number of methods of providing a response are known. For example, the user can provide a rating on a scale for the perceptual appearance characteristic. For example, the user may be asked "How glossy does this material appear?" and choose a number from 0 to 10. Alternatively, the user may be asked to modify another material to match the stimulus, such as adjusting the colour of another material until it matches what they perceive to be the colour of the stimulus. Another alternative is to ask the user to compare pairs of stimuli and decide which has the perceptual appearance characteristic more strongly, for example the user can be asked "Which material is more glossy?". The choice of response type is based on the difficulty of the task for the user (generally comparing is easier, while rating and matching are more difficult) and the usefulness of the resulting data (generally comparisons are less useful while matching and rating are more useful).

Next, the results are gathered for all users. The users' responses are converted to scale values, using a method appropriate to the type of response given. Then a model is constructed by fitting a mathematical function between the stimulus values and the observed responses.

The method 500 progresses under execution of the processor 105 from step 530 to a rendering step 540. In execution of step 540, the resulting combination of modified mesh and material reflective properties is rendered using the method 800 of FIG. 8.

In order to create the final rendering, the method 500 effectively accesses a perceptual model and determines a perceptual appearance of the object formed form the material. The perceptual appearance characteristics of the object relate to an initial mesoscale structure of the object, for example a default height or a height set by the user using the slider 660, and at least one light scattering parameter such as a roughness of the BRDF function of the material.

The arrangements described are applicable to the computer and data processing industries and particularly for the graphics and 3D modelling industries.

In adjusting the reflective properties of the material to maintain a perceived visual characteristic such as glossiness, the arrangements described allow a graphical interface such as the interface 610 to include controls relating to high level concepts, easily understood by users that are not graphics experts. The arrangements described further allow a higher level focus than existing three dimensional editing software. The user is effectively sheltered from complex relationship between the preserved perceptual characteristics and the reflective properties of the material. Rather the complex relationship is handled via the perceptual model to preserve the user's desired or intended visual effect. The user can accordingly achieve a desired effect with reduced iterations of properties compared to previous solutions.

The foregoing describes only some embodiments of the present invention, and modifications and/or changes can be made thereto without departing from the scope and spirit of the invention, the embodiments being illustrative and not restrictive.

The invention claimed is:

1. A method of rendering a graphical object in response to a modification in structure, the method comprising:
   accessing a mapping relating a mesoscale structure and at least one light scattering parameter of a material to a perceptual appearance characteristic;
   determining a perceptual appearance characteristic of the graphical object, the graphical object reproduced on an interface to represent an object formed from the material, the perceptual appearance characteristic determined in accordance with the mapping using an initial mesoscale structure and at least one light scattering parameter of the material;
   receiving, via the interface, a signal indicating the modification in structure, the modification in structure relating to modification of the initial mesoscale structure;
   determining, using the mapping, an adjustment of the at least one light scattering parameter preserving the determined perceptual appearance characteristic, based on the modification of the initial mesoscale structure;
   adjusting the at least one light scattering parameter of the material according to the determined adjustment; and
   rendering the graphical object using the modified mesoscale structure and the adjusted at least one light scattering parameter.

2. The method according to claim 1, wherein the preserved perceptual appearance characteristic is one of gloss and colour.

3. The method according to claim 1, wherein the at least one light scattering parameter of the mapping is at least one of reflectivity and roughness of a bidirectional reflectance distribution function (BRDF) function of the material.

4. The method according to claim 1, wherein the signal to modify the mesoscale structure relates to modification of a height scale value of the graphical object.

5. The method according to claim 1, wherein if the modification in structure relates to a height scale value of the material, the adjusted at least one light scattering parameter relates to a roughness of a bidirectional reflectance distribution function (BRDF) and the preserved perceptual appearance characteristic is glossiness of the material.

6. The method according to claim 1, wherein the rendering comprises determining regions of the graphical object in shadow relative to a direct light source.

7. The method according to claim 1, wherein the rendering comprises determining a mesh relating to the object and determining a closest visible face of the mesh closest to a pixel of a display screen.

8. The method according to claim 1, wherein the at least one light reflecting parameter is determined based on a microfacet model of the graphical object.

9. The method according to claim 1, wherein the graphical object represents a substantially flat object with variations in height.

10. The method according to claim 1, wherein forming a modified mesoscale structure comprises updating a mesh representation of the graphical object.

11. The method according to claim 1, wherein the signal to modify the mesoscale structure relates to modification of one of a frequency or randomness of a roughness of a surface of the material.

12. The method according to claim 1, wherein if the modification in structure relates to a height scale value of the material, the adjusted at least one light scattering parameter relates to the diffuse colour in the bidirectional reflectance distribution function (BRDF) and the preserved perceptual appearance characteristic is the perceived colour of the material.

13. The method according to claim 1, wherein the at least one light scattering parameter of the mapping relates to a colour used for rendering the material.

14. Apparatus configured to render a graphical object, comprising:
   a display;
   a memory;
   a processor configured to execute code stored on the memory to:

reproduce, on the display, a graphical user interface (GUI);

access a mapping relating a mesoscale structure and at least one light scattering parameter of a material to a perceptual appearance characteristic;

determine a perceptual appearance characteristic of the graphical object, the graphical object representing an object formed from the material, the perceptual appearance characteristic determined in accordance with the mapping using an initial mesoscale structure and at least one light scattering parameter of the material;

reproduce the graphical object on the GUI based on the determined perceptual appearance characteristic;

receive, via the GUI, a user interaction indicating a modification in structure of the initial mesoscale structure;

determine, using the mapping, an adjustment of the at least one light scattering parameter preserving the perceptual appearance characteristic, based on the modification of the initial mesoscale structure;

adjust the at least one light scattering parameter of the material according to the determined adjustment; and render, in the GUI, the graphical object using the modified mesoscale structure and the adjusted at least one light scattering parameter.

15. Apparatus according to claim 14, wherein the user interaction relates to interaction with one or more sliders, each representing mesoscale structure of the material presented by the GUI.

16. Apparatus according to claim 15, wherein the one or sliders relate to at least one of a height ratio and frequency of bumps of a surface of the graphical object.

17. Apparatus according to claim 14, wherein if the modification in structure relates to a height scale value of the material, the adjusted at least one light scattering parameter relates to a roughness of a bidirectional reflectance distribution function (BRDF) and the preserved perceptual appearance characteristic is the glossiness of the material.

18. A non-transitory computer-readable medium having a computer program stored thereon in response to a modification in structure, the method comprising:

access a mapping relating a mesoscale structure and at least one light scattering parameter of a material to a perceived gloss of a material;

determine a perceived gloss of the graphical object, the graphical object reproduced on an interface to represent an object formed from the material, the perceived gloss determined in accordance with the mapping using an initial mesoscale structure and at least one light scattering parameter of the material;

receive, via user interaction with the GUI, a signal indicating a modification in a height scale value of the material;

determine, using the mapping, an adjustment of roughness of the material preserving the perceived gloss, based on the modification;

adjust the at roughness of the material of the graphical object according to the determined adjustment; and render the graphical object using the modified height scale value and the adjusted roughness.

19. A system, comprising:

a memory; and a processor, wherein the processor is configured to execute code stored on the memory for implementing a method rendering a graphical object in response to a modification in structure, the method comprising:

accessing a mapping relating a mesoscale structure and at least one light scattering parameter of a material to a perceptual appearance characteristic;

determining a perceptual appearance characteristic of the graphical object, the graphical object reproduced on an interface to represent an object formed from the material, the perceptual appearance characteristic determined in accordance with the mapping using an initial mesoscale structure and at least one light scattering parameter of the material;

receiving, via the interface, a signal indicating the modification in structure, the modification in structure relating to modification of the initial mesoscale structure;

determining, using the mapping, an adjustment of the at least one light scattering parameter preserving the determined perceptual appearance characteristic, based on the modification of the initial mesoscale structure;

adjusting the at least one light scattering parameter of the material according to the determined adjustment; and rendering the graphical object using the modified mesoscale structure and the adjusted at least one light scattering parameter.

* * * * *